United States Patent [19]
Huang

[11] Patent Number: 5,644,074
[45] Date of Patent: Jul. 1, 1997

[54] PRESSURE GAUGE RESET MECHANISM

[76] Inventor: Tien-Tsai Huang, No. 4, Lane 30, WU-Chang Street, Pan-Chiao City, Taipei Hsien, Taiwan

[21] Appl. No.: 615,841

[22] Filed: Mar. 14, 1996

[51] Int. Cl.$^6$ .................................................. B60C 23/04
[52] U.S. Cl. .......................... 73/146.8; 73/744; 116/34 R
[58] Field of Search .............................. 73/744, 745, 746, 73/146.8; 116/34 R, 271

[56] References Cited

U.S. PATENT DOCUMENTS 4,916,944  4/1990  Ho-Chuan .

FOREIGN PATENT DOCUMENTS 838471  6/1981  U.S.S.R. .................................. 73/744

*Primary Examiner*—George M. Dombroske
*Assistant Examiner*—Joseph L. Felber
*Attorney, Agent, or Firm*—Bacon & Thomas

[57] ABSTRACT

A pressure gauge reset mechanism including a cylinder having a pressure measuring head at one end, a piston forced by a first spring toward the pressure measuring head, a toothed pressure rod extending out of the cylinder, an actuating rod member having one end stopped at the piston and an opposite end fixedly connected to the toothed pressure rod, a second spring fixedly connected to the actuating rod member to push it upwards against the piston, and a pressure gauge coupled to the cylinder, the pressure gauge having an index shaft with a gear meshed with the toothed pressure rod, and a torsional spring mounted on the inside to hold down the index shaft and having one end stopped at the inside of the pressure gauge and an opposite end extending out of the pressure gauge and fixedly connected with a button, wherein the second spring member is compressed and the index shaft is turned by the toothed pressure rod to move the index of the pressure gauge when the piston is forced by the pressure being applied to the pressure measuring head to move the actuating rod member; when the button is depressed after each measurement, the torsional spring is released from the index shaft, and the second spring member is released to push the actuating rod member and the pressure rod back to their former positions, and therefore the index of the pressure gauge is returned to the zero reading position.

4 Claims, 2 Drawing Sheets

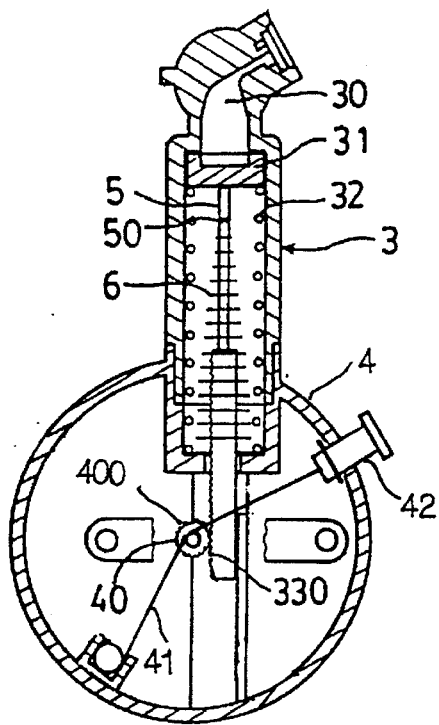 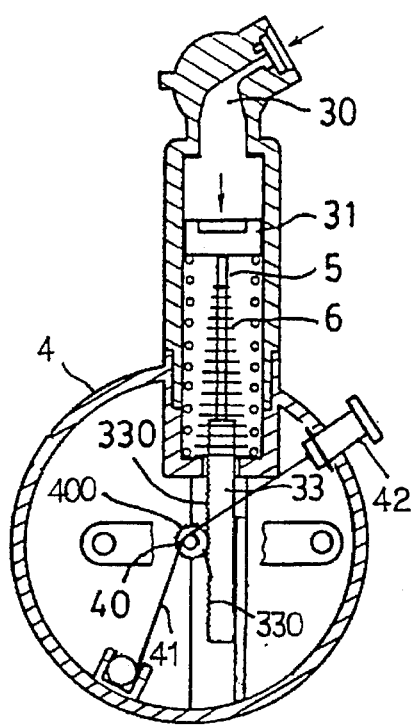
FIG.3　　　　　FIG. 4
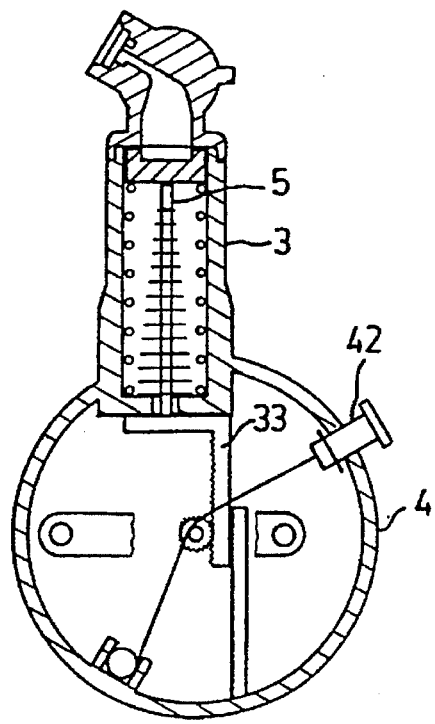
FIG.5

5,644,074

PRESSURE GAUGE RESET MECHANISM

BACKGROUND OF THE INVENTION

The present invention relates to pressure gauges, and relates more particularly to a pressure gauge reset mechanism which accurately zeroes the reading of the pressure gauge after each measurement.

FIG. 1 shows a pressure gauge reset mechanism according to the prior art which is generally comprised of a cylinder (1) having a pressure measuring head (10) at one end, and a pressure gauge (2) coupled to the cylinder (1). The pressure gauge (2) comprises an index shaft with a gear (20), and a torsional spring (21) mounted on the inside to hold down the index shaft with a gear (20). The torsional spring (21) has one end stopped at the inside of the pressure gauge (2), and an opposite end extending out of the pressure gauge (2) and fixedly connected with a button (22). The cylinder (1) comprises a piston (11) having a head (110) and a rod (111) perpendicularly extending from the head (110) at one side, a first spring member (12) mounted on the inside to force the piston (11) upwards toward the pressure measuring head (10), a pressure rod (14) having a toothed portion 140 extending out of the cylinder (1) and meshed with the gear of the index shaft (20), and a second spring member (13) having a bottom end stopped at the top end of the pressure rod (14) and a top end coupled to the rod (111) of the piston (11) (see also FIG. 2). When the pressure measuring head 10 of the cylinder 1 is attached to the air valve of the tire to be measured, the piston (11) is forced downwards by the pressure of the tire, causing the second spring member (13) to force the pressure rod (14) out of the cylinder (1), therefore the index shaft (20) is turned by the pressure rod (14) to move the index. When the button (22) is depressed after each measurement, the torsional spring (21) releases the index shaft (20) and therefore the pressure rod is forced by the second spring (13) to return to its initial position. When the pressure rod (14) is pulled upwards to its former position, the index shaft (20) is turned to zero the reading of the index. This structure of pressure gauge reset mechanism is functional, however it is not durable in use because the second spring member (13) tends to wear with use. If the second spring member (13) wears, the pressure rod (14) cannot be accurately returned to its former position, causing the index shaft (20) unable to accurately zero the reading of the index.

SUMMARY OF THE INVENTION

The present invention has been accomplished to provide a pressure gauge reset mechanism which eliminates the aforesaid problem. It is the major object of the present invention to provide a pressure gauge reset mechanism which accurately zeroes the reading of the index after each measurement.

According to one aspect of the present invention, the pressure gauge reset mechanism comprises a cylinder having a pressure measuring head at one end, and a pressure gauge coupled to the cylinder, the pressure gauge comprising an index shaft, an index fixedly mounted on the index shaft and turned by it to indicate the value of pressure applied to the pressure measuring head, a gear fixedly mounted around the index shaft and driven to turn the index shaft, a torsional spring mounted on the inside to hold down the index shaft, the torsional spring having one end stopped at the inside of the pressure gauge and an opposite end extending out of the pressure gauge and fixedly connected with a button, the cylinder comprising a piston, a first spring member mounted on the inside to force the piston upwards toward the pressure measuring head, and a pressure rod reciprocated by the piston, the pressure rod having a toothed portion meshed with the gear of the index shaft, wherein an actuating rod member is mounted inside the cylinder having one end stopped at the piston and an opposite end fixedly connected to one end of the pressure rod; a second spring member is sleeved onto the actuating rod member, having one end fixedly secured to the actuating rod member and an opposite end stopped against the cylinder at a bottom end thereof; the second spring member is compressed and the index shaft is turned by the pressure rod through the gear to move the index when the piston is forced by the pressure being applied to the pressure measuring head to move the actuating rod member; when the button is depressed after each measurement, the torsional spring is released from the index shaft, and the second spring member is released to push the actuating rod member and the pressure rod back to their former positions, and therefore the index is returned to the zero reading position. According to another aspect of the present invention, pressure rod can be a straight rod so that the button can be mounted on the pressure gauge at the left side relative to the cylinder, or an angle rod so that the button can be mounted on the pressure gauge at the right side relative to the cylinder.

BRIEF DESCRIPTION OF THE DRAWINGS

FIG. 3 is a sectional assembly view of a pressure gauge reset mechanism according to the present invention;

FIG. 4 shows the pressure gauge reset mechanism of FIG. 3 operated to indicate a pressure; and FIG. 5 is a sectional assembly view of an alternate form of the present invention.

DETAILED DESCRIPTION OF THE PREFERRED EMBODIMENT

Figure 1:
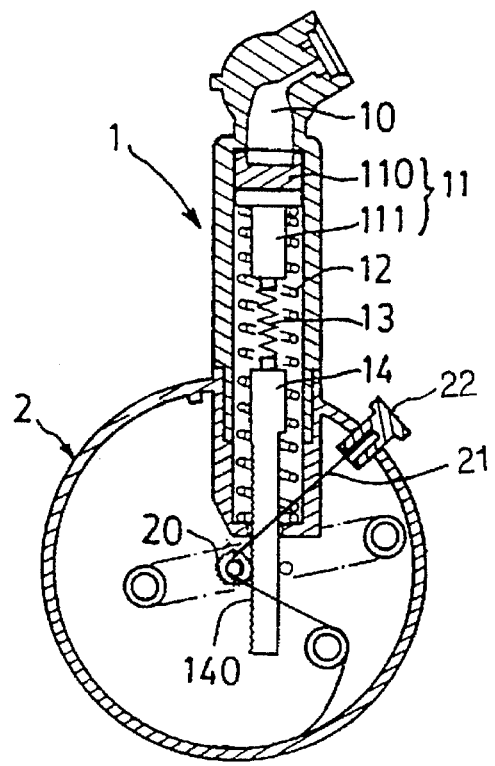
FIG. 1 is a sectional assembly view of a pressure gauge reset mechanism according to the prior art.
Figure 2:
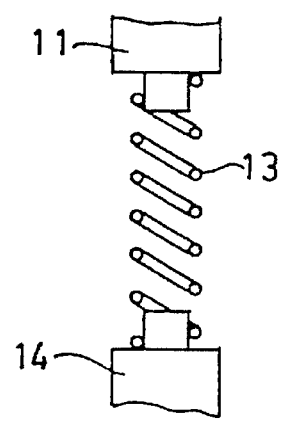
FIG. 2 is a partial view in an enlarged scale of the pressure gauge rest mechanism shown in FIG. 1.

Referring to FIGS. 3 and 4, a pressure gauge reset mechanism in accordance with the present invention is generally comprised of a cylinder 3, a pressure gauge 4, a rod member 5, and an expansion spring 6. The cylinder 3 comprises a pressure measuring head 30 at one end, a spring 32 mounted on the inside, a piston 31 mounted on the inside and forced upwards toward the pressure measuring head 30 by the spring 32, and a pressure rod 33 extending out of the bottom end thereof. The pressure rod 33 has a toothed portion 330 longitudinally disposed at one side. The pressure gauge 4 is coupled to the cylinder 3, having an index shaft 40, a gear 400 fixedly mounted around the index shaft 40 and meshed with the toothed portion 330 of the pressure rod 33, a torsional spring 41 mounted on the index shaft 40 and having one end stopped inside the pressure gauge 4 and an opposite end extending out of the pressure gauge 4 and connected to a button 42. The torsional spring 41 gives a pressure to the index shaft 40, causing it to force the gear 400 into engagement with the toothed portion 330 of the pressure rod 33. The rod member 5 is mounted inside the cylinder 3 having made with an annular groove 50 around the periphery and stopped against the piston 31, and an opposite end fixedly connected to the pressure rod 33. The expansion spring 6 is sleeved onto the rod member 5, having one end fastened to the annular groove 50 and an opposite end stopped at the bottom wall of the cylinder 3 on the inside.

The assembly process of the pressure gauge reset mechanism is easy and outlined hereinafter with reference to FIG. 3, the piston 31 is inserted into the cylinder 3 from the bottom end and attached to the inside of the pressure measuring head 30, then the spring 32 is mounted inside the cylinder 3 to force the piston 31 against the pressure measuring head, then the expansion spring 6 is sleeved onto the rod member which is fixedly and longitudinally connected to one end of the pressure rod 33, and fixedly secured to the annular groove 50, and then the rod member S with the expansion spring 6 are inserted into the cylinder 3 and stopped against the piston 31, permitting the opposite end of the expansion spring 6 to be stopped inside the bottom end (remote from the pressure measuring head 30) of the cylinder 3, and then the pressure gauge 4 is coupled to the cylinder 3 to force the gear 400 of the index shaft 40 into engagement with the toothed portion 330 of the pressure rod 33. When assembled, the button 42 is disposed at the left side relative to the cylinder 3. The spiral direction of the expansion spring 6 is reversed to that of the spring 32, for example, the expansion spring 6 turns counter-clockwise; the spring 32 turns clockwise.

Referring to FIG. 4 again, when the pressure measuring head 30 is pressed on the air valve of the tire, the piston 31 is forced by the pressure of the tire to move the rod member 5 downwards. When the rod member 5 is moved downwards, the pressure rod 33 is simultaneously moved in the same direction. Because the toothed portion 330 of the pressure rod 33 is meshed with the gear 400 of the index shaft 40, the downward movement of the pressure rod 33 causes the gear 400 to turn the index shaft 40, and therefore the index of the pressure gauge is turned to indicate the pressure of the tire. At the same time, the expansion spring 6 is compressed. When the button 42 is depressed after each measurement, the torsional spring 41 releases the index shaft 40, and therefore the expansion spring 6 is released to push the rod member 5 back to its former position. When the rod member 5 returns to its former position, the pressure rod 33 is forced back, and the index of the pressure gauge 4 is released and returned to the zero reading position.

FIG. 5 shows an alternate form of the present invention in which the pressure rod 33 is an angle rod having a shorter horizontal end perpendicularly connected to the rod member 5. This design allows the button 42 to be mounted on the pressure gauge 4 at the right side relative to the cylinder 3.

It is to be understood that the drawings are designed for the purposes of illustration only, and are not intended as a definition or limits of the spirit and scope of the invention disclosed.

What the invention claimed is:

1. A pressure gauge reset mechanism of the type comprising a cylinder having a pressure measuring head at one end, and a pressure gauge coupled to said cylinder, said pressure gauge comprising an index shaft, a gear fixedly mounted around said index shaft and driven to turn said index shaft, a torsional spring mounted on the inside to hold down said index shaft, said torsional spring having one end stopped at the inside of said pressure gauge and an opposite end extending out of said pressure gauge and fixedly connected with a button, said cylinder comprising a piston, a first spring member mounted on the inside to force said piston toward said pressure measuring head, and a pressure rod reciprocated by said piston, said pressure rod having a toothed portion meshed with the gear of said index shaft, wherein an actuating rod member is mounted inside said cylinder having one end stopped at said piston and an opposite end fixedly connected to one end of said pressure rod; a second spring member is sleeved onto said actuating rod member, having one end fixedly secured to said actuating rod member and an opposite end stopped against said cylinder at a bottom end thereof; said second spring member is compressed and said index shaft is turned by movement of said pressure rod through said gear when said piston is forced by the pressure being applied to said pressure measuring head to move said actuating rod member; when said button is depressed, said torsional spring is released from said index shaft, thereby enabling said second spring member to push said actuating rod member and said pressure rod back to their former positions, and therefore the gauge is returned to a zero reading position.

2. The pressure gauge reset mechanism of claim 1 wherein said first spring member and said second spring member are spiral springs respectively turned in opposite directions.

3. The pressure gauge reset mechanism of claim 1 wherein said pressure rod is a straight rod.

4. The pressure gauge reset mechanism of claim 1 wherein said pressure rod is an angle rod.

* * * * *